Oct. 9, 1962 R. J. GARMY 3,057,935
SUPPORTING AND CURRENT SUPPLYING MEANS FOR
CONSUMABLE ELECTRODES IN ELECTRIC FURNACES
Original Filed Nov. 22, 1957 9 Sheets-Sheet 2
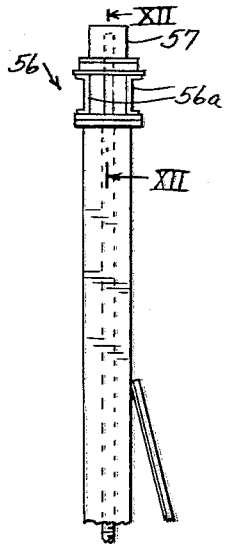
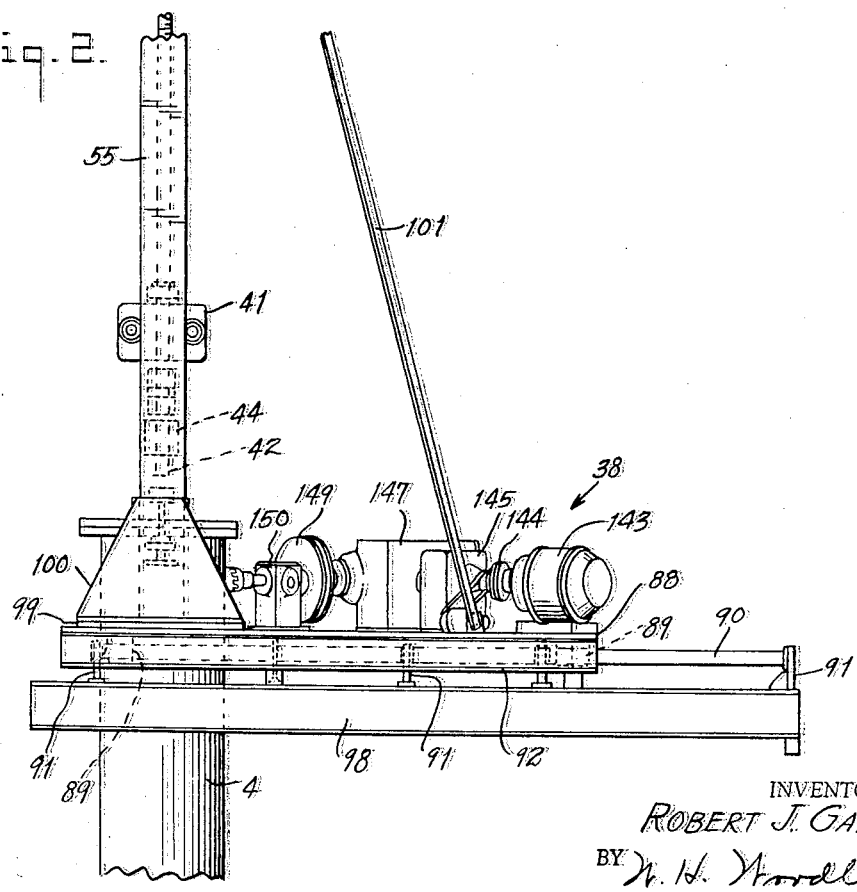
Fig. 2.
INVENTOR.
ROBERT J. GARMY
BY
ATTORNEY

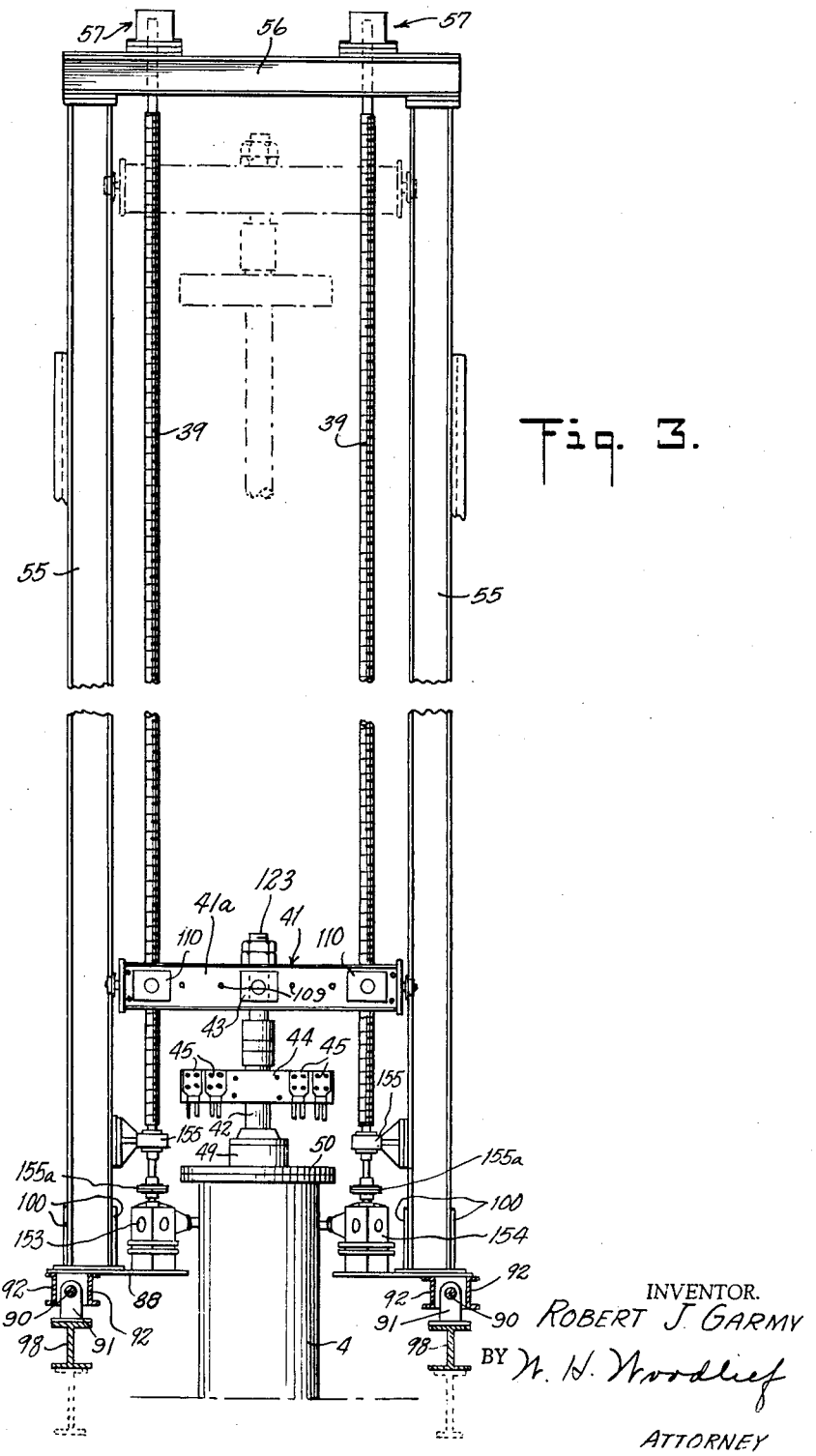

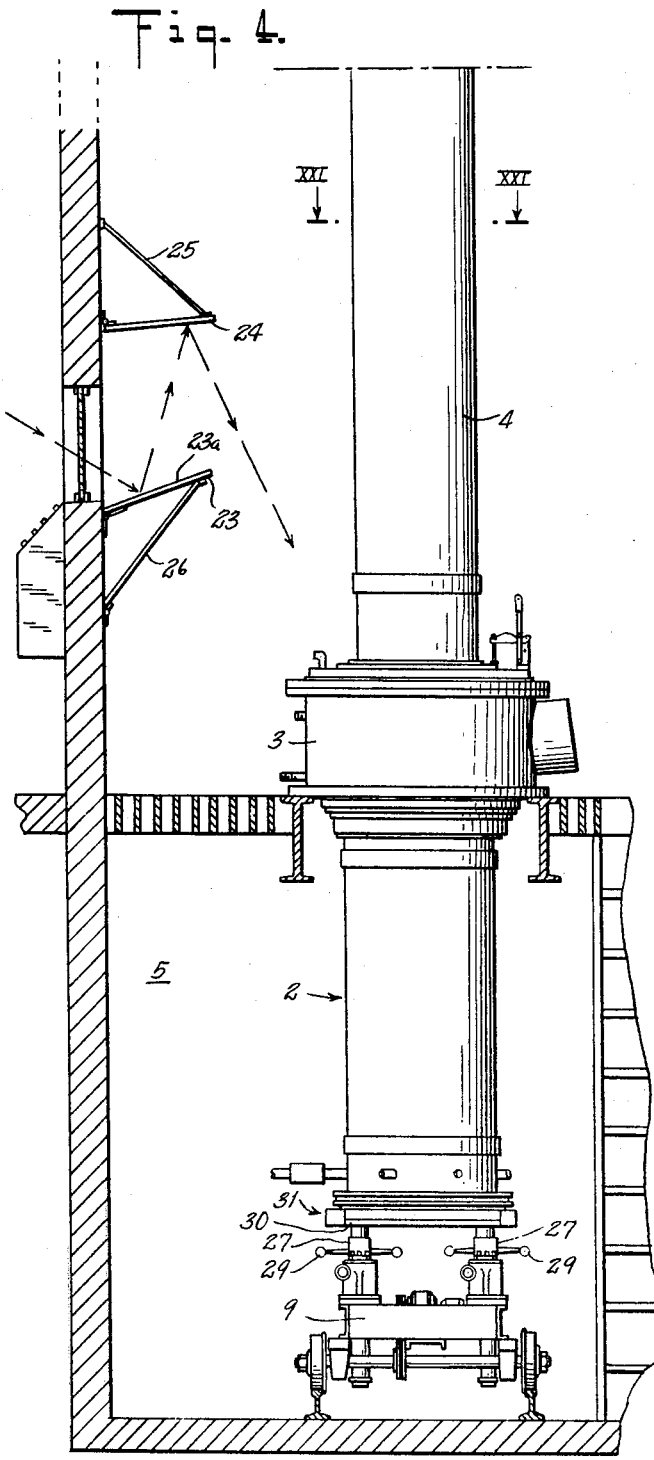

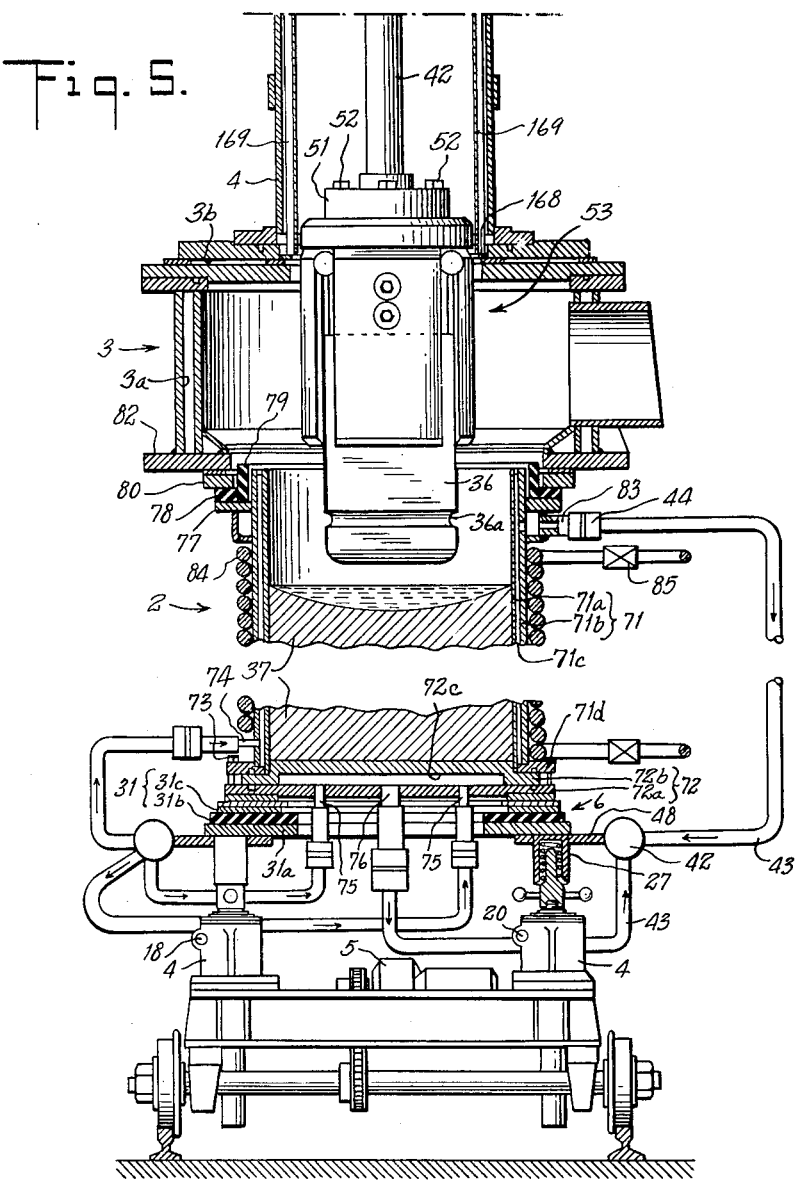

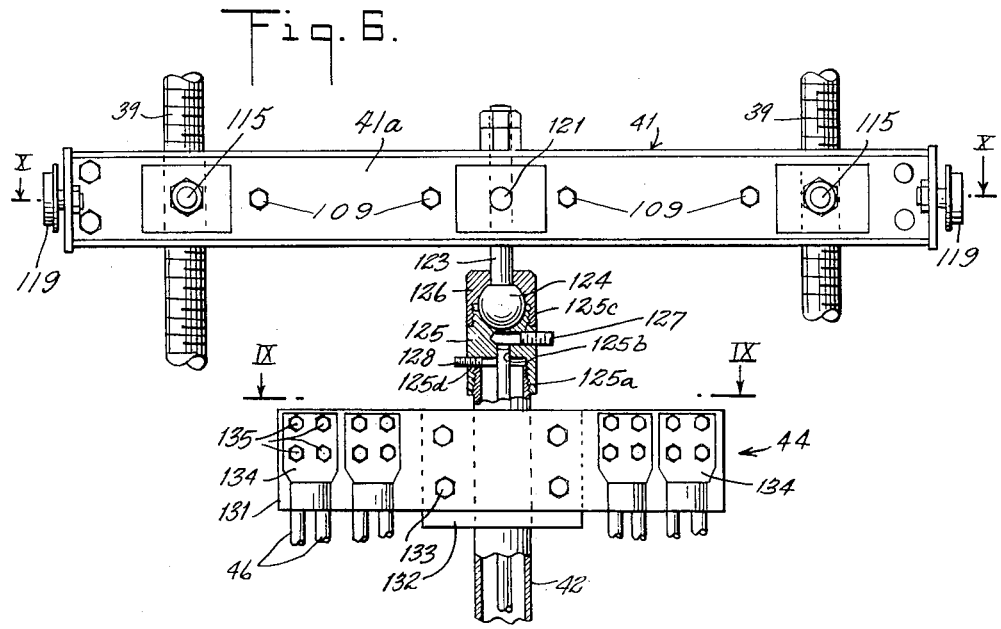
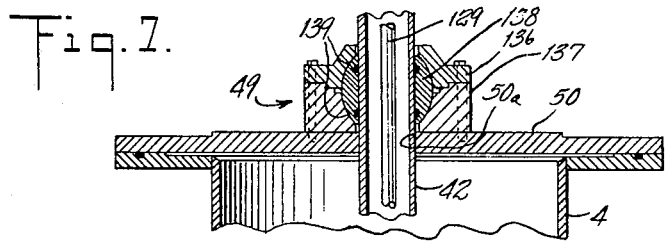
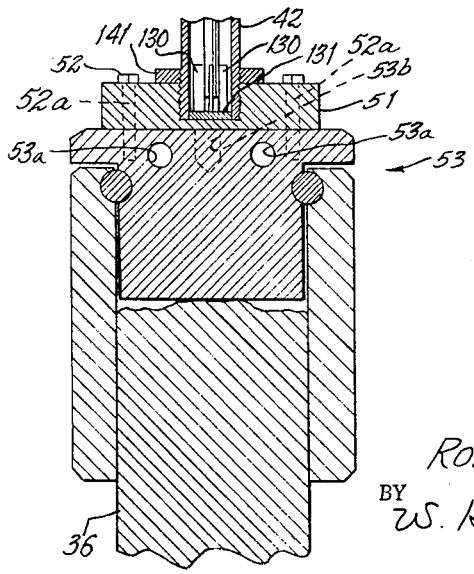

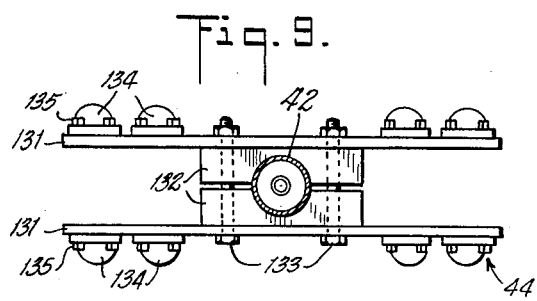
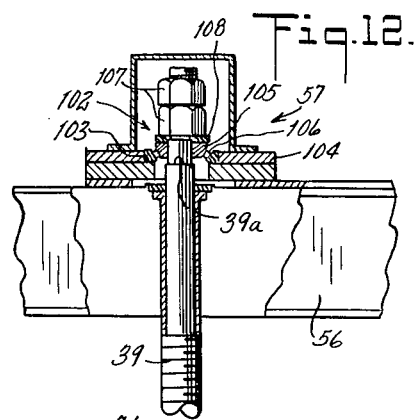
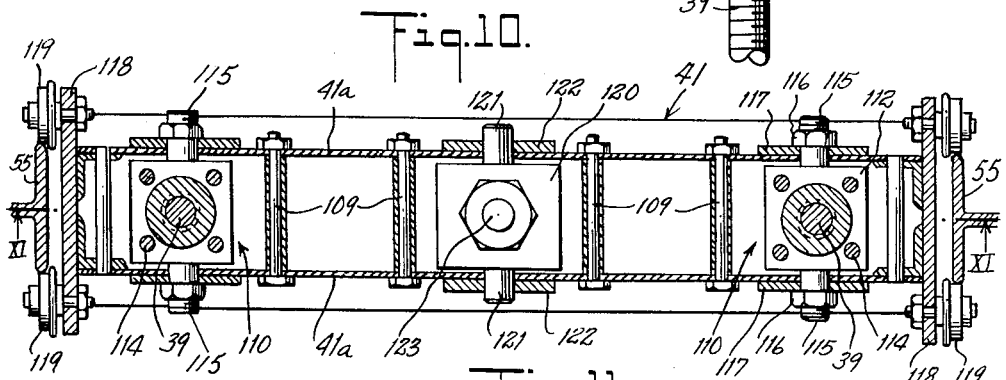
INVENTOR.
ROBERT J. GARMY
BY
W. H. Woodlief
ATTORNEY

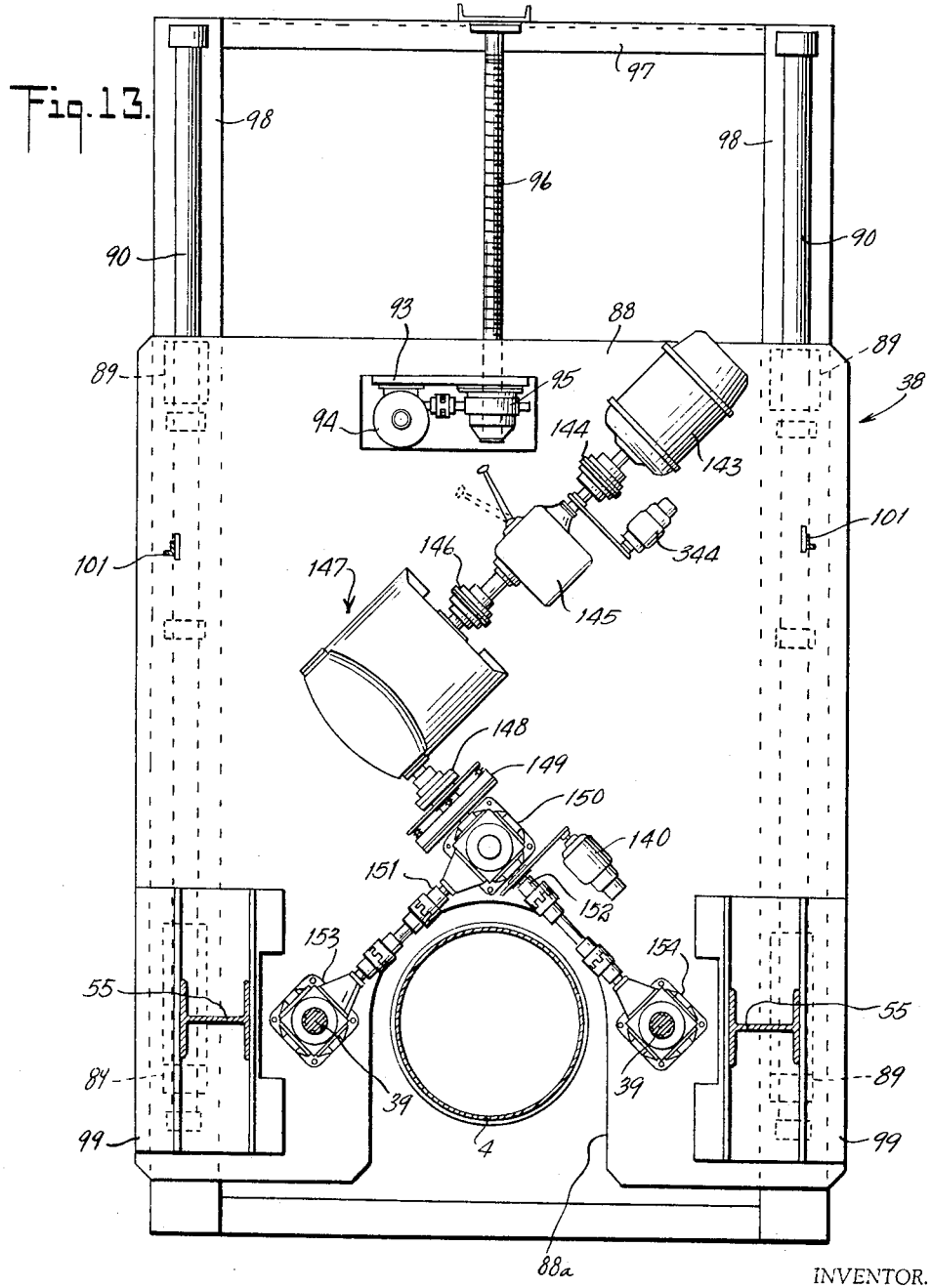

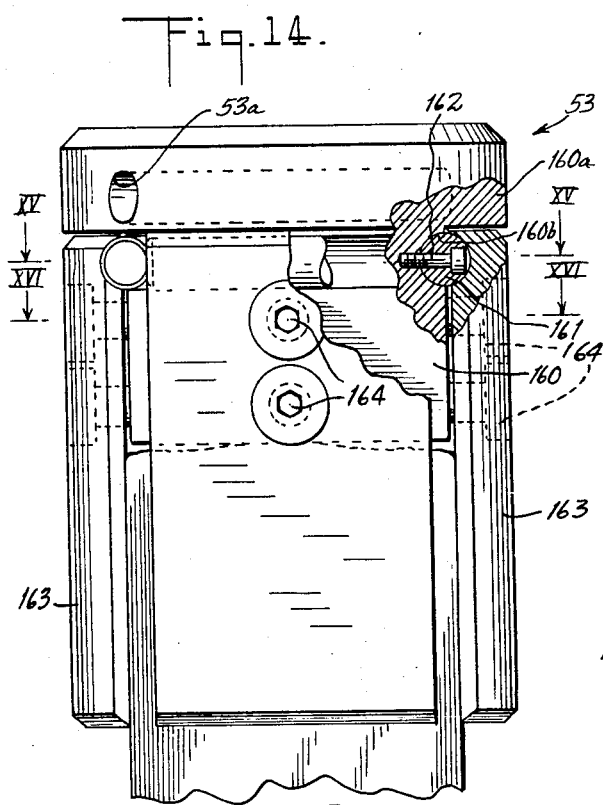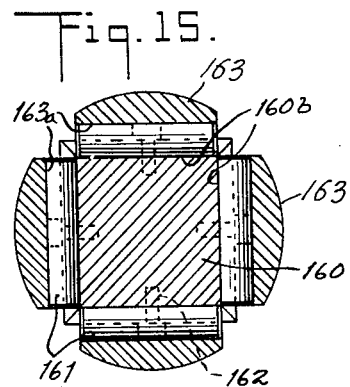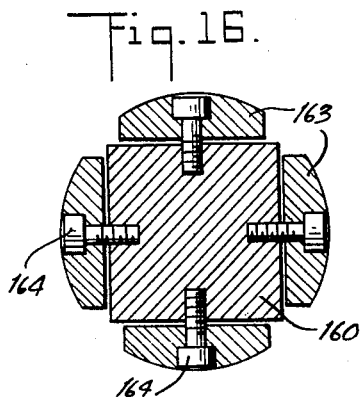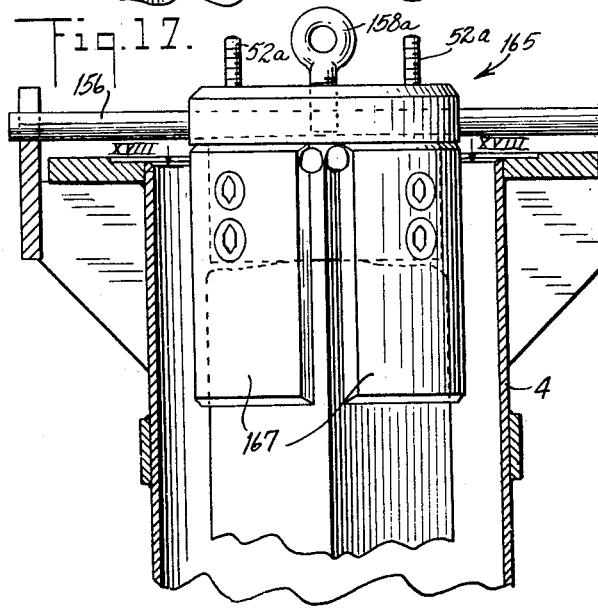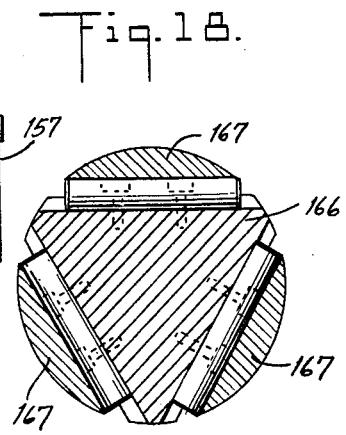

United States Patent Office 3,057,935
Patented Oct. 9, 1962

3,057,935
SUPPORTING AND CURRENT SUPPLYING MEANS FOR CONSUMABLE ELECTRODES IN ELECTRIC FURNACES
Robert J. Garmy, Canton, Ohio, assignor to Republic Steel Corporation, Cleveland, Ohio, a corporation of New Jersey
Original application Nov. 22, 1957, Ser. No. 698,256. Divided and this application July 17, 1959, Ser. No. 827,960
14 Claims. (Cl. 13—14)

This is a division of my copending application for U.S. Letters Patent, Serial No. 698,256, filed November 22, 1957, now Patent Number 2,973,452, issued February 28, 1961, entitled Electric Furnace Utilizing Consumable Electrodes and Method of Operating Same.

This invention relates to electric furnaces and particularly to furnaces for producing metallic ingots of high purity. The furnace described herein was designed especially for use with and has successfully been used with metals such as titanium, zirconium and the like, which are difficult to melt because of their high melting points and also because of their high chemical activity at their melting points. This furnace has also been successfully used with other metals, e.g., steel, where an ingot of high purity was desired.

A problem of particular difficulty in connection with furnaces for use in the melting of titanium and the like is the problem of safety with respect to the persons controlling the operation of the furnace and loading and unloading it. The extremely high operating temperatures involved, in the neighborhood of 3140° F. (the melting point of titanium) and the great chemical activity of metals such as titanium and zirconium at their melting points make the probability of an explosion extremely high if oxygen, air or water is allowed to leak into the furnace. Furthermore, if the structural parts of the furnace (which are commonly made of other metals having lower melting points) become overheated, those parts are likely to be destroyed, with resultant contact between the molten titanium and air or water.

Another difficult problem in connection with such furnaces is the difficulty of loading them. The furnace described herein is fed with consumable electrodes formed of titanium and/or other metal to be treated. For example, these electrodes may be compressed from titanium sponge and/or scrap by the method and apparatus described in the copending application of Thomas A. Sindelar, Serial No. 571,810, filed March 15, 1956, now Patent Number 2,925,619, issued February 23, 1960, entitled "Consumable Electrode Billets and Method and Apparatus for Making the Same." These electrodes are melted in the furnace by means of an arc so that the electrode itself must carry heavy electrical current. In loading such an electrode into the furnace, it is necessary not only to connect it physically to a supporting structure, but also to connect it electrically to a power supply structure. Furthermore, the supporting structure must be adapted to move or feed the electrode to the arc. Since large currents are involved, the electrical connection of such electrodes has in the past been a rather time consuming operation.

Although continuously fed furnaces have been suggested, so far as is known, all commercially successful furnaces up to the present, including the furnace disclosed herein, have been batch furnaces, using electrodes of finite length.

Titanium ingots are being produced in increasingly large sizes. In a batch type furnace, which must be shut down after each electrode is consumed for the insertion of a new electrode, the size of ingot which can be produced is limited by the size of electrode which can be fed. Consequently, increasingly larger electrodes are being used to produce the larger ingots, and the problem of supporting such electrodes is becoming increasingly difficult.

An object of the present invention is to provide improved apparatus for loading a consumable electrode into a furnace of the type described and for making electrical contact to such an electrode.

Another object of the invention is to provide improved mechanism for supporting an electrode in the furnace and for feeding it to the arc.

The foregoing and other objects of the invention are attained in the furnace described herein.

The furnace includes a crucible mounted on a truck for horizontal movement along a set of rails. The crucible is supported on the truck by means of a set of jacks so that it may be raised and lowered on the truck. When in its operating position, the crucible is raised on the truck so that its upper end sealingly engages the periphery of an opening in the bottom of a furnace shell.

Mounted on the upper end of the shell is a vertically elongated electrode receiving casing or tube. The electrode supporting mechanism is located above the electrode receiving tube and includes a power tube which extends through a seal in a cover at the top end of the electrode receiving tube and is vertically slidable in that seal.

The mechanism for supporting and feeding the electrode includes a clamp for engaging an end of the electrode. The clamp serves both as a support and as a means for conducting electric current to the electrode. The clamp is removably fastened to a contact plate located at the bottom end of the power tube which extends upwardly through the cover of the electrode receiving tube. The upper end of the power tube is attached by means of terminals and cables to a power supply. The power tube hangs from a crosshead which moves on two vertically extending lead screws. The lead screws hang from a crossbar mounted on two vertical masts. The lead screws are driven concurrently by a motor and suitable connecting gears and shafts. The entire supporting mechanism, including the motor, the masts, the crossbar, the crosshead, and the power tube and related parts are mounted on a carriage which is movable horizontally and located just below the level of the upper end of the electrode receiving tube. This carriage may be moved between an operating position in which the power tube is aligned vertically with the electrode receiving tube and a loading and unloading position in which the power tube and all the supporting mechanism are displaced horizontally from above the electrode receiving tube to permit the insertion of a new electrode by means of a crane or the like.

Each electrode clamp is provided with means, for example, horizontal holes, through which rods may be inserted, to support it temporarily on the top of the electrode tube. When loading a new electrode, the cover is removed from the electrode receiving tube and is lifted upwardly upon engagement by the contact plate carried at the lower end of the power tube. The rods are inserted through the clamp to hank the old clamp and the stub end of the oil electrode on the electrode tube. The contact plate is then disconnected from the clamp and lifted away vertically. The entire supporting mechanism including the carriage then moves horizontally to clear the space above the electrode receiving tube. The old clamp and stub electrode can then be removed by a crane. A new electrode with a clamp attached to its upper end is then inserted in the electrode receiving tube by means of the crane, and is hung on the upper end of the tube by means of inserted rods. The crane and its cables are then unfastened and taken away. The carriage is then restored to its operating position and the contact plate is fastened to the new clamp by means of nuts and bolts. The new electrode is then raised slightly to permit the removal of the temporary supporting rods, and the power tube is then lowered to bring the cover into place. After the cover is fastened, the furnace is ready to proceed with further steps preliminary to a melting operation.

Other objects and advantages of the invention will become apparent from the following description and claims, taken together with the accompanying drawings.

In the drawings:

FIG. 2 is a side elevational view, on a larger scale, of the electrode feeding and supporting mechanism shown in FIG. 1;

Figure 1:
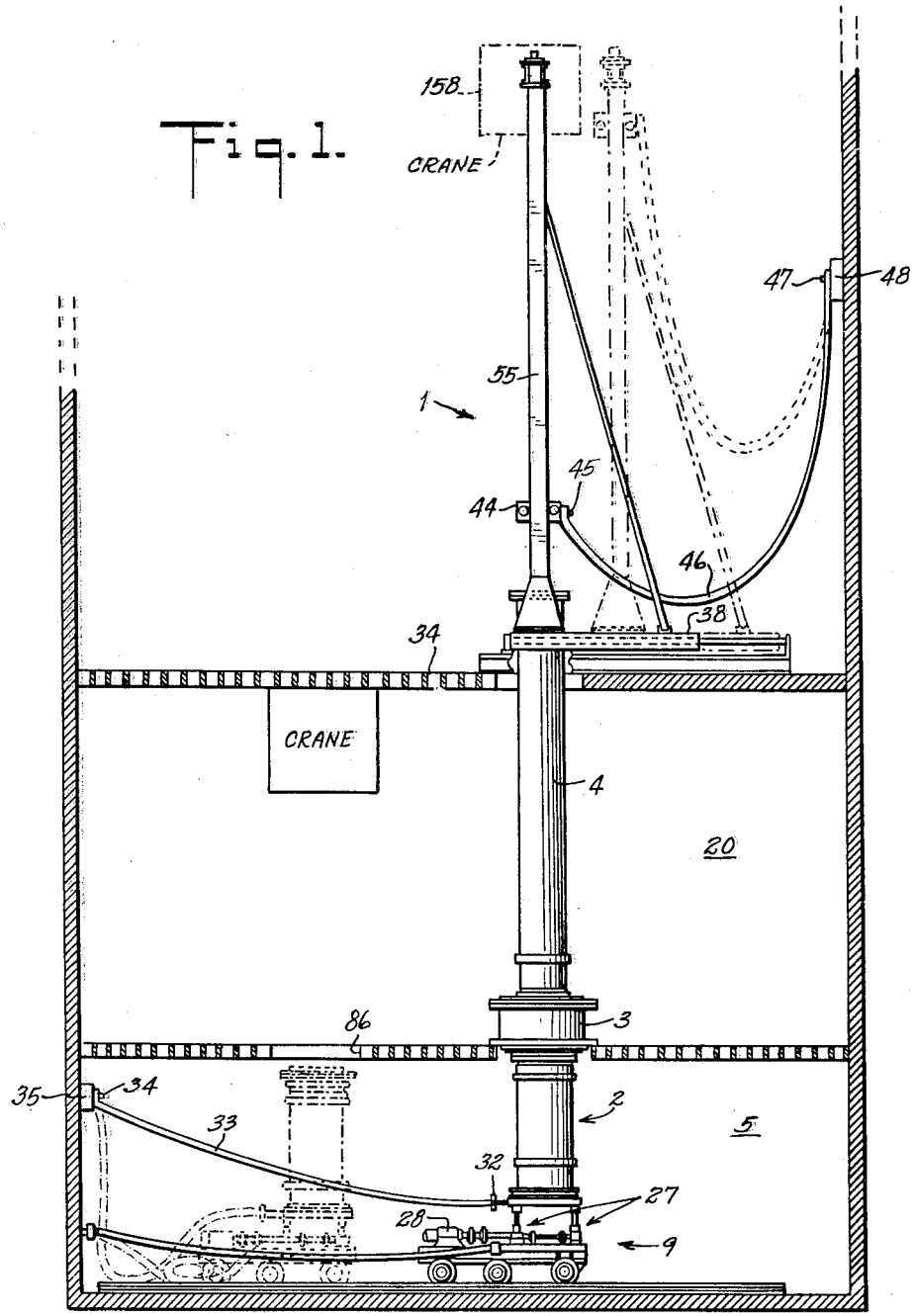
FIG. 1 is an overall elevational view of a furnace embodying the invention, and showing the parts in full lines in their operating positions and in their loading and unloading positions in dotted lines.

FIGS. 3 and 4 combined show an elevational view of the furnace taken from the left as viewed in FIG. 1;

FIG. 5 is a cross-sectional view of the crucible and related parts;

FIG. 6 is a detailed view showing the crosshead and its related parts, similar to a portion of FIG. 3 but on a larger scale;

FIG. 7 is a detailed view on the same scale as FIG. 6, showing the power tube and its sealing connection through the cover of the electrode receiving tube;

FIG. 8 is a view on the same scale as FIG. 6, showing in section the lower end of the power tube and its connection to the electrode clamp;

FIG. 9 is a cross-sectional view on line IX—IX of FIG. 6, showing the terminal structure used on the power tube;

FIG. 10 is a view partly in plan and partly in section on the line X—X of FIG. 8, showing the crosshead;

FIG. 11 is a sectional view on the line XI—XI of FIG. 10;

FIG. 12 is a fragmentary section on the line XII—XII of FIG. 2;

FIG. 13 is a plan view of the carriage and related parts of the electrode supporting mechanism;

FIG. 14 is an elevational view, with certain parts broken away and others shown in section, of one form of electrode clamp which may be used with the furnace apparatus of the invention;

FIG. 15 is a cross-sectional view taken on the line XV—XV of FIG. 14;

FIG. 16 is a cross-sectional view taken on the line XVI—XVI of FIG. 14;

FIG. 17 is an elevational view on a smaller scale of a modified form of electrode clamp, showing it resting temporarily on the upper end of the electrode receiving tube, the latter being shown in section;

FIG. 18 is a cross-sectional view taken on the line XVIII—XVIII of FIG. 17;

FIG. 19 is a plan view of an electrode guide structure used inside the electrode receiving tube;

FIG. 20 is an elevational view of the guide structure of FIG. 19;

FIG. 21 is a cross-sectional view of the electrode receiving tube, taken on the line XXI—XXI of FIG. 4, showing the guide structure in place and guiding an electrode; and FIG. 22 is a view similar to FIG. 20, showing a modified form of guide.

Sec. 1.—General Furnace Structure—FIGS. 1 to 5

These figures illustrate an electric furnace which is generally indicated by the reference numeral 1. Many details of the furnace structure have been omitted from FIG. 1 for purposes of clarification. The furnace 1 comprises a crucible 2 in which an ingot is formed during operation of the furnace, a generally cylindrical shell or housing 3 above the crucible 2, and an electrode receiving casing or tube 4 which projects upwardly from the shell 3. A truck 9 carries the crucible 2 and is movable between an operating position shown in full lines in FIG. 1 and a loading and unloading position shown in dotted lines.

There are three operating levels for the furnace 1. The lowest level comprises a crucible chamber 5 in which the crucible 2 and the truck 9 are located and in which the crucible 2 and the ingot formed therein are unloaded from the truck 9.

As best seen in FIGS. 1 and 4, the truck 9 carries four jacks 27 which may be driven concurrently by means of a motor 28 and suitable gearing, or may be operated individually by means of handwheels 29. The four jacks 27 support a platform 31, best seen in FIG. 5, comprising a steel bottom plate 31a, an electrically insulating plate 31b, and an upper electrically conductive plate 31c. All three of the plates 31a, 31b, 31c have aligned central openings. The bottom of the crucible 2 rests on the platform 31. One edge of the plate 31c is provided with an extension on which is mounted a plurality of terminals 32 (FIG. 1) of any conventional construction and of heavy current carrying capacity. The terminals 32 are connected by a like plurality of flexible cables 33 to a like plurality of stationary terminals 34 mounted on a busbar structure 35. The cables 33 are long enough and have sufficient slack so that the truck 9 may move between its operating position, shown in full lines in FIG. 1, and its loading and unloading position, shown in dotted lines, without disconnecting either the terminals 32 or the terminals 34.

The second operating level of the furnace 1 is the furnace chamber 20. On the floor of this chamber (shown as a steel grating) there is mounted the furnace shell 3. The shell 3 is of a considerably greater diameter than the electrode 36 which extends downwardly through that shell, and consequently provides a substantial annular space around a portion of the electrode as best seen in FIG. 5. At the shell 3 various instrumentalities having to do with the control of the atmosphere inside the furnace are connected, as illustrated diagrammatically in FIG. 4. The shell wall is made double to provide a water jacket 3a (FIG. 5) and its top or head is also double walled to provide a head water jacket 3b.

The electrode tube 4 is mounted on the head of the shell 3 and extends upwardly therefrom a substantial distance, e.g., 12 to 15 feet. The electrode tube 4 is provided to enclose a consumable electrode such as shown as 36 in FIG. 5, which is being fed to the furnace to form an ingot 37 in the bottom of the crucible 2.

The electrode 36 may be of compressed titanium sponge as shown and claimed in detail in the above mentioned copending application of Thomas A. Sindelar, Serial No. 571,810, filed March 15, 1956, entitled "Consumable Electrode Billets and Method and Apparatus for Making Same."

It has become conventional in the making of titanium ingots to run the titanium through a two-step process. In the first step, an electrode of compressed titanium sponge, as just described, is formed into an ingot having a somewhat larger diameter than the original electrode. This ingot, which has been considerably purified by the elimination of the impurities during its formation, is then passed through a repetition of the ingot forming step. In this second step, the first ingot is used as an electrode and is melted down again in an arc and forms a second ingot of larger diameter. The purpose of the two ingot forming operations is to increase the purity and homogeneity of the final product. The melting down of the material in the arc is very effective to remove those impurities which are gaseous or volatile at the temperatures employed. Since these temperatures are in the neighborhood of the melting point of titanium, namely 3140° F., it may be seen that most impurities are thereby removed. The double operation results in an ingot of high purity and homogeneity. Since titanium is still quite an expensive metal, it is commonly used only where its peculiar heat resistant properties and high strength to weight ratio are of great advantage. Such properties are at their best when the metal or alloy is most nearly free of undesirable contaminants. Consequently, practically all the present demand for titanium and its alloys is for the highly purified forms which may best be manufactured by repeating the melting step.

In any ingot forming operation using consumable electrodes of finite length, there is left a short butt end of the electrode which may not be used without danger to the clamp structure and possible contamination of the ingot. These butt ends are used by welding them to the ends of other butts, or other electrode billets. The welding operation commonly used leaves a groove in the outer surfaces of the electrode, as shown at 36a in FIG. 5.

The ingots formed in the first melt are considerably shorter and more dense than the compressed billets which are supplied to that first melt. In order to provide an electrode of greater length for the second melt, it is common to weld together two or more of the short electrodes from the first melt. These electrodes also are characterized by grooves in their outer surfaces at the weld points, as shown at 36a.

The third or upper level of the furnace 1 has a floor 34 (shown as a steel grid) a short distance (two or three feet) below the upper end of the electrode receiving tube 4. This floor supports the electrode feeding and driving mechanism. That mechanism is all mounted on a carriage 38 which moves horizontally between an operating position shown in full lines in FIG. 1 and a loading and unloading position shown in dotted lines in FIG. 1. Mounted on the carriage 38 are two upwardly extending masts 55 connected at their upper ends by a crossbar 56 (FIG. 3). Two lead screws 39 depend from thrust bearings 57 carried by the crossbar 56. The lead screws 39 turn in nuts 110 which are fixed against rotation on a crosshead 41. A power tube 42 depends from a thrust bearing 43 on the crosshead 41. Near its upper end, the power tube 42 carries a bracket 44 to which are attached a plurality of heavy duty terminals 45. The terminals 45 are attached to a like plurality of heavy duty flexible electrical cables 46 (FIG. 1), whose opposite ends are attached to fixed terminals 47 located on a busbar structure 48.

The power tube 42 extends downwardly through a sealing mechanism 49 (FIG. 3) located on a cover 50 at the top of the electrode receiving tube 4. Below the cover 50, the power tube 42, as best seen in FIG. 5, carries at its lower end a contact plate 51 attached by means of stud bolts on which are threaded nuts 52 to an electrode clamp generally designated at 53 and described in detail below in connection with FIGS. 14 to 16. The electrode clamp 53 engages the upper end of the electrode 36 and not only supports it but serves as a path for conducting electricity to it.

*Sec. 2.—Electrode Supporting Mechanism FIGS. 1 to 13*

As mentioned above in connection with the general furnace structure, the electrode supporting mechanism is mounted on carriage 38 (FIGS. 1, 2 and 13) which moves horizontally between the operating position shown in full lines in FIG. 1 and the loading position shown in dotted lines. The carriage 38 comprises a flat steel plate 88 having a recess 88a (FIG. 13) cut in its front edge. Four slide bearings 89 depend from the plate 88 and slide on a pair of rails 90. Each rail 90 is mounted on three spaced brackets 91 (FIGS. 2 and 3) attached to an I-beam 98, which forms part of the structure for supporting the floor 34. Underneath each side of the plate 88 and on opposite sides of the respective rails 90, there are attached two steel beams 92 (FIG. 3) of channel-shaped cross-section for stiffening the plate 88.

Near the back central portion of the plate 88 there is mounted a bracket 93 (FIG. 13) which extends downwardly from the plate 88 and supports a reversible motor 94 which drives a traveling nut 95 through suitable gearing. The nut 95 moves along a stationary lead screw 96 attached to a frame member 97 extending between the I-beams 98. By energizing the reversible motor 94, the nut 95 may be driven along the lead screw 96 to move the carriage 38 between its operating and loading positions.

The two masts 55, shown as steel I-beams, are mounted on reinforcing plates 99 at the front part of the opposite sides of the plate 88. Vertical reinforcing plates 100 are provided on either side of both masts, to stiffen the connection between the masts and the plate 88. A pair of guy members 101, FIG. 2, are attached at their lower ends to brackets on the plate 88 and at their upper ends to brackets on the masts 55.

The crossbar 56 connecting the tops of the masts is shown (FIG. 2) as comprising a pair of channel shaped beams 56a. The two vertical lead screws 39 are supported on the crossbar 56 by means of combined thrust and guide bearings generally indicated at 57, one of which is shown in detail in FIG. 12. In that figure, the bearing may be seen generally at 102, and includes a tapered outer race 103 fixed on a plate 104 supported on the crossbar 56, a tapered inner race 105 mounted on the upper end of one of the lead screws 39, and a plurality of balls or other antifriction members 106, which run between the races. The upper end of the lead screw 39 is provided with a shoulder 39a to receive the race 105. The race 105 is held against upward movement on the lead screw 39 by a pair of jam nuts 107 and a washer 108.

The crosshead 41 is supported on the two lead screws 39. The crosshead 41 comprises two channel shaped beams 41a held together by means of bolts 109 (FIG. 10). Adjacent each end of the crosshead 41, there is mounted between the two beams 41a a traveling nut structure 110 (see FIGS. 10 and 11). Each traveling nut structure 110 comprises two nuts 111 which threadedly engage one of the lead screws 39 and which are separated by a spacer block 112, having an opening at its center to receive an antifriction sleeve 113 through which the lead screw 39 passes. The nuts 111 and the spacer block 112 are held together by means of a plurality of bolts 114. The spacer block 112 has integrally formed with it a pair of oppositely projecting trunnions 115 (see FIG. 10) which extend through openings in the respective beams 41a, and whose outer ends are threaded to receive nuts 116 which bear against bearing plates 117. Each traveling nut structure 110 is thereby free to pivot for alignment purposes about a horizontal axis extending through the trunnions 115. After alignment is completed, the nuts 116 are tightened.

At each end of the crosshead 41 there is mounted a plate 118 which pivotally supports a pair of flanged rollers 119 adapted to engage the edges of the flanges of the adjacent mast 55. The rollers 119 are horizontally aligned and engage opposite sides of a mast 55 so as to guide the crosshead vertically and to prevent horizontal twisting movements of the crosshead.

At its center, the crosshead 41 supports a bearing block 120 by means of integral trunnions 121 which project from the opposite sides of the block 120 through aligned apertures in the beams 41a. The beams 41a carry bearing plates 122 to take the load on the trunnions. The block 120 has a vertically extending aperture through its center to receive a pin 123 (FIG. 11). An electrically insulating sleeve 123a encircles the pin 123 and insulates it from the block 120. On the lower end of pin 123 there is integrally formed a ball 124 (FIG. 6) which is received in a spherical socket formed in a socket base 125 and a cap 126 threaded onto the base 125. The base 125 is provided on its lower end with an internally threaded socket 125a to receive the threaded upper end of power tube 42. Concentric with the socket 125a, and opening into the upper end thereof, there is provided a central passage 125b which communicates with a laterally extending passage 125c adapted to receive an external water supply coupling member 127. Another passage 125d is provided to receive another coupling member 128 and to provide communication with the socket 125a. A water pipe 129 is concentric with the power tube 42 and has its upper end received in the opening 125b. The lower end of the water pipe 129 is provided with a plurality of wings 130 which support its lower end above a plug 131 which closes the lower end of the power tube 42. The couplings 127, 128, the various passages in the socket base 125 and the water tube 129 cooperate to provide a path for circulating coolant, e.g., water, from coupling 127 through central pipe 129, out through its lower end, up through the power tube 42 and out the coupling 128. The coolant is necessary because the power tube 42 carries heavy electrical currents and tends to become overheated due to the power loss in the resistance of the tube 42.

Just below the socket base 125 there is mounted on the power tube 42 the terminal block generally indicated by the reference numeral 44. The terminal block 44, as best seen in FIGS. 6 and 9, comprises a pair of plates 131, a pair of spacer blocks 132, a plurality of bolts 133 holding the plates 131 and the blocks 132 together and clamping the assembly on the tube 42. A plurality of cable tip connectors 134 are attached to the ends of the plates 131 by means of bolts 135. The cable tip connectors 134 are attached to the ends of cables 46 (see FIG. 1). The cables 46 are flexible and have sufficient slack to allow movement of the electrode supporting mechanism between its operating position and its loading and unloading position. This slack is also sufficient to allow the vertical movement of the terminal block 44 between the upper and lower positions shown in FIG. 1.

At an intermediate locality along its vertical length, the power tube 42 passes through a seal and joint structure 49 and through an aperture 50a formed in the center of the cover 50 of the electrode tube 4. The seal and joint structure 49 comprises a socket formed in upper and lower socket blocks 136, 137, and a ball 138 having a central vertically extending aperture to receive the power tube 42 and a spherical outer surface which rides in blocks 136, 137. O-ring seals 139 are provided between the ball 138 and the power tube 42.

The lower end of the power tube 42 is threaded into a recess in the contact plate 51. The power tube 42 and the contact plate 51 are fixed together by means of a lock nut 141. Nuts 52 cooperating with stud bolts 52a (see FIG. 17) provide for attachment to the contact plate 51 of the electrode clamp 53 which is described in detail below in connection with FIGS. 14 to 16.

It should be noted that the ball 138 and its cooperating socket, together with the ball 124 and its cooperating socket allow considerable freedom of lateral and angular movement of the power tube 42 relative to the crosshead 41, and vice versa. These joint structures thereby prevent binding of the various parts during operation of the furnace.

The electrode supporting mechanism described above is driven vertically through the lead screws 39, which are in turn driven by power actuating mechanism best illustrated in FIGS. 13 and 2. This mechanism includes a motor 143 connected through a coupling 144 to a speed changing transmission 145 and thence through a coupling 146 to a right angle speed reducer 147. The output shaft of the speed reducer 147 is connected through a coupling 148 and a slip friction clutch 149 to a miter gear unit 150 having two output shafts 151 and 152 extending at right angles to each other and connected through suitable couplings to right angle miter gear units 153 and 154 respectively connected to the bottoms of the lead screws 39.

The lower ends of the lead screws 39 extend through guide bearings 155 (FIG. 3) mounted on the masts 55, and are connected to the gear units 153 and 154 through couplings 155a of a conventional type, constructed so that they do not transfer any thrust to or from the lead screws 39.

The load of the electrode is applied to the lead screws 39 through the crosshead 41, and the lead screws are supported only at their upper ends by bearings 57. Consequently, the lead screws are stressed only in tension, in which condition their strength is greatest.

A tachometer generator 344 is driven from the output shaft of motor 143. A telemetric generator 140 is driven from one of the output shafts of gear unit 150, and is connected to an integrating receiver on the control panel to provide the operator with an indication of the position of the electrode.

Sec. 3.—Electrode Changing Operation

At the end of a run, the electrode clamp 53 within the furnace tube 4 will have connected to its lower end a short electrode butt. The operation of removing this butt and replacing it with a fresh electrode for a new run of the furnace will now be described.

After the arc current is shut off at the end of the run, the motor 143 is reversed to drive the lead screws 39 in the direction to move the crosshead 41 upwardly, thereby carrying with its the power tube 42 and the clamp 53 with the electrode butt attached thereto. The vacuum inside the furnace is relieved so that it does not tend to hold the cover in place on the end of the electrode tube 4. When the contact plate 51 engages the under side of the cover 50, the cover is lifted from the end of the electrode tube 4. The upward movement of the electrode butt and its related parts is continued until horizontal holes 53a formed in the electrode clamp 53 are at a level somewhat above the top of the electrode tube 4. Rods 156 (FIG. 17) are then inserted through the holes 53a. The electrode clamp is rotated by means of rods 156 until they are in line with saddles 157 mounted on the upper end of the electrode tube 4. The motor is then driven to move the electrode clamp downwardly until the rods 156 rest in the saddles 157. The weight of the electrode butt and the clamp 53 is now taken by the rods 156. The nuts 52 are then removed from stud holes 52a. After removal of the nuts 52, the motor 143 is again driven to move the power tube 42 and its related parts including plate 51 and cover 50 upwardly to the uppermost position shown in FIG. 1. After these parts reach that position, the motor 143 is stopped and the motor 94 is actuated to move the carriage 38 back to the dotted line position shown in FIG. 1. The clamp 53 is now free overhead for access by a crane shown diagrammatically at 158, FIG. 1. A ring pin 158a (FIG. 17) is inserted in a threaded hole 53b (FIG. 8) formed in the upper surface of the electrode clamp to receive the hook of the crane 158. The electrode butt and the clamp are then lifted by the crane 158 and taken to another location where the butt may be disassembled from the clamp.

A new electrode with a clamp 53 assembled thereon is then moved into place by the crane 158, and lowered into the electrode tube 4 until the holes 53a in the clamp are slightly above the saddles 157. The rods 156 are then inserted in the holes and are aligned with the saddles, whereupon the crane lowers the clamp until the weight of the electrode and clamp is taken by the rods 156. The crane is then unhooked and the ring pin removed from the clamp 53.

The motor 94 is now operated to move the carriage 38 into its operating position. When it reaches that position, the motor 143 is run to lower the power tube 42 and the contact plate 51 until the latter comes into engagement with the electrode clamp 53. The nuts 52 are threaded on the stud bolts 52a to fasten the contact plate 51 to the electrode clamp 53. The motor 143 is then run to lift the electrode slightly and take the weight off the rods 156. The rods are thereupon removed and the motor 143 is then run to drive the electrode downwardly until the cover 50 again rests on the top of the electrode tube 4. The cover may be clamped in place by means of C-clamps, or any other suitable means. After the furnace is evacuated, as it is during operation, the difference between the external pressure and the internal pressure tends to hold the cover 50 in place so that the C-clamps may then be removed.

Sec. 4.—Electrode Clamps. FIGS. 14 to 18

Two species of electrode clamps are shown in FIGS. 14 to 16 and FIGS. 17 and 18 respectively. The specific clamping structures shown herein are described more completely and claimed in the copending application of Arthur F. Jones and Donald O. Rice, Serial No. 697,702, filed November 20, 1957, now Patent Number 2,964,580, issued December 13, 1960.

The clamp of FIGS. 14 to 17 comprises a clamp body 160 which is generally T-shaped in vertical cross-section, having a central stem portion and an upper flange portion 160a. Near its upper end, the stem portion is provided with four grooves 160b for receiving four pivot pins 161. The pivot pins 161 are held in place in the grooves 160b by means of screws 162. Four clamp arms 163 are attached to the outside of the clamp body 160 by means of bolts 164. The lower ends of these clamp arms tightly engage the sides of the end of an electrode, as best seen in FIG. 14. The surfaces of the clamp arms facing the electrode may be variously contoured to accommodate various electrode shapes. It should be understood, however, that it is not necessary to have an exact or even a close matching of the clamp arm contours and the electrode contours. The clamp arms 163 are tightened against the end of the electrode by means of the bolts 164. The tightening of these bolts accommodates minor variations in the electrode contour and also tightens the upper ends of the clamp arms against the pivot pins 161. The upper ends of the clamp arms are provided with grooves 163a which are cylindrical in contour, conforming to the pins 161 so that the clamp arms can pivot freely on the pins 161 during the tightening of the clamp arms against the electrode end.

The clamp 53 of this construction is assembled on the electrode with the lower end of the clamp body 160 abutting against the end of the electrode, which may have a rough irregular contour. The principal path of flow of electrical current to the electrode is through the body 160, the pins 161, downwardly through the clamp arms 163 and thence through the sides of the electrode. Relatively little current is carried through the end of the electrode and the abutting surface of the clamp body 160, since those surfaces are not forced together tightly by the clamp mechanism.

The electrical disconnection and connection of an electrode to the arc circuit may be accomplished during the loading and unloading of the furnace by the relatively simple mechanism described in Sec. 3 involving the removal and replacement of nuts 52 (FIG. 5) from studs 52a (FIG. 17). The detachment of the electrode furnace from its supporting structure also serves to disconnect it from the heavy current arc circuit. The operation of attaching the clamp 53 to an electrode may be performed at a location remote from the furnace, while the furnace is operating, to prepare the electrode for use in the furnace. The shutdown time of the furnace between runs is thereby decreased, since it is not necessary to keep the furnace shut down while a high capacity electrical connection is made to the electrode structure itself.

FIGS. 17 and 18 show a modified form of electrode clamp generally indicated by the reference numeral 165. The principal difference between this clamp and the one in FIGS. 14 to 16 is that the electrode body 166 is triangular in horizontal cross-section instead of being rectangular as in the case of the body 160. The clamp 165 uses three clamp arms 167 instead of the four clamp arms of FIGS. 14 to 16. The three clamp arm arrangement is sometimes better for handling electrodes of certain contours.

Sec. 5.—Electrode Guide Structures. FIGS 19 to 22

These figures illustrate two species of electrode guide structure which is fixed to the inside of the electrode receiving tube 4, as shown in FIG. 21. FIGS. 19 to 21 illustrate one species which comprises a plurality of spacer rings 168 which are held in vertically spaced relationship by a plurality of stretchers 169. The stretchers 169 are shown as formed of angle irons and have their angular corners extending inwardly from the spacer rings 168, as best seen in FIG. 21. The corners of the stretchers 169 fit between the clamp arms 163 (see FIG. 21), so that when an electrode is lowered into the tube 4, the stretchers 169 prevent rotation of the electrode in the furnace.

FIG. 22 illustrates an alternative and more simply constructed form of electrode guide which may be used in place of that shown in FIGS. 19 to 21. This electrode guide consists of a steel cylindrical tube 350 having a plurality of flanges 351 welded to its periphery at spaced points along its length, with two of the flanges near the ends of the tube 350. The end flanges are braced by means of triangular webs 352. A plurality of holes 350a are located at spaced intervals along the tube 350, to facilitate handling thereof by means of a crane.

The electrode receiving tube 4 and the guide structure are usually operated at the same potential as the electrode itself, commonly ground potential. Consequently, it is permissible for these parts to come in contact during operation. On the other hand, the crucible is at a different potential (usually positive) from the electrode, and it is desirable to maintain the lateral spacing between the electrode and the crucible so as to ensure that the arc forms only between the end of the electrode and the forming ingot. The guide maintains that lateral spacing by holding the ingot against swinging movements. In effect, it serves as an adapter to accommodate differences between the inside diameter of the electrode receiving tube and the outside diameter of the electrode 36. If an electrode of different outside diameter is to be used, then a guide of different diameter is substituted.

The guide structure of FIGS. 19 to 21 engages the sides of both the clamp and the electrode, while the guide of FIG. 22 engages the clamp only. If the electrode dimensions are oversize, the guide of FIGS. 19 to 21 may occasionally bind an electrode. However, the guide of FIG. 22 operates satisfactorily even with substantially oversize electrodes.

While I have shown and described a preferred embodiment of my invention, other modifications thereof will readily occur to those skilled in the art and I therefore intend my invention to be limited only by the appended claims.

I claim:

1. In an electric furnace, a cover having an aperture therein, socket means mounted on the outside of said cover encircling said aperture, said socket means having an aperture therethrough aligned with said cover aperture, a ball received in said socket means aperture for rotation therein, said ball having an aperture aligned with said cover aperture and said socket means aperture, a power tube connected to an electrode of said furnace and extending through said aligned apertures and slidable vertically therethrough, means for effecting vertical movement of said power tube through said aligned apertures, and sliding seal means within said ball and slidably engaging said power tube, said ball and socket means cooperating to allow limited universal movement of said power tube with respect to said cover.

2. An electric furnace comprising a consumable electrode adapted to be fed vertically to said furnace, a clamp disposed above and engaging said electrode for holding said electrode for said vertical movement thereof upon vertical movement of said clamp, said clamp providing an upwardly facing surface transverse to the vertical, a contact plate disposed above said clamp and providing a downwardly facing surface transverse to the vertical, said surfaces being disposed and formed for mutual engagement upon vertical movement of one toward the other so as to establish electrical connection of said plate to said clamp, removable securing means for securing said plate to said clamp and with said surfaces in said engagement with each other, means supporting said plate for vertical movement thereof and of said clamp when secured to said plate and for moving said plate vertically away from said clamp when said securing means is removed, electrical current supply means, means electrically connecting said plate to said current supply means, and reversible drive means operatively connected to said plate supporting means for effecting vertical movement of said plate supporting means and of said plate downwardly to feed said electrode to said furnace and upwardly to remove said plate from said furnace.

3. An electric furnace comprising a consumable electrode adapted to be fed vertically to said furnace, a clamp disposed above and engaging said electrode for holding said electrode for said vertical movement thereof upon vertical movement of said clamp, said clamp providing an upwardly facing surface transverse to the vertical, a contact plate disposed above said clamp and providing a downwardly facing surface transverse to the vertical, said surfaces being disposed and formed for mutual engagement upon vertical movement of one toward the other so as to establish electrical connection of said plate to said clamp, removable securing means for securing said plate to said clamp and with said surfaces in said engagement with each other, means supporting said plate for vertical movement thereof and of said clamp when secured to said plate and for moving said plate vertically away from said clamp when said securing means is removed, electrical current supply means, means electrically connecting said plate to said current supply means, a casing defining the space within said furnace and provided with an upwardly facing opening, temporary support means carried by said casing adjacent said upwardly facing opening thereof, and means removably engageable with said clamp and adapted to engage said temporary support means for supporting said clamp and said electrode clamped thereby upon said temporary support means adjacent said opening of said casing for detachment and attachment of said contact plate from and to said clamp upon removal of said securing means and restoration thereof concomitantly with vertical movement of said plate.

4. An electric furnace as defined in claim 2, comprising means defining an electrode receiving upwardly facing opening in said furnace, and a removable cover for said opening, said means supporting said plate for vertical movement thereof comprising an electrode supporting member extending slidably through an aperture in said cover, sealing means on said cover sealingly engaging said member, means on the lower end of said supporting member attaching said contact plate thereto, and means drivingly supporting the upper end of said member for raising and lowering the same.

5. An electric furnace as defined in claim 4, in which said means electrically connecting said plate to said current supply means comprises terminal means movable with and mounted on said supporting member above said cover, stationary terminal means, and flexible cables connecting said movable terminal means and said stationary terminal means.

6. An electric furnace as defined in claim 2, which comprises a carriage movable between a feeding position above said furnace and a retracted position spaced horizontally from said feeding position, a framework mounted on said carriage and supporting said contact supporting means, said reversible drive means comprising reversible motor means mounted on said carriage and operatively connected to said contact plate supporting means for effecting said vertical movement thereof.

7. An electric furnace, comprising a crucible, an electrode receiving tube extending upwardly from said crucible, a removable cover for the upper end of said receiving tube, means for feeding a consumable electrode to said crucible including a clamp for engaging a portion of said electrode, removable temporary support means for hanging said clamp with an electrode depending therefrom at the upper end of said tube when the cover is removed therefrom, an electrode supporting rod extending through an aperture in said cover, sealing means on said cover sealingly engaging said rod, a contact plate attached to the lower end of said rod, demountable means for electrically and supportingly connecting said contact plate to said clamp when in position on said temporary support means, means for raising and lowering said rod and operable first to lift said cover and contact plate demounted from said clamp to a position clear of the receiving tube to permit insertion of an electrode and its clamp therein to said position on said temporary support means, thereafter to lower the contact plate for attachment to the clamp, thereafter to lift the plate and clamp sufficiently to free the temporary support means for removal, and thereafter to lower said plate and clamp and the cover into place and then to feed the electrode into the furnace, and means for supplying electric current to said electrode including said clamp, said contact plate, said rod, terminal means mounted on said rod, stationary terminal means, and flexible cables connecting said rod-mounted terminal means and said stationary terminal means.

8. In an electric furnace, a crucible, an electrode receiving tube extending upwardly from said crucible, a removable cover for the upper end of said receiving tube, means for vertically feeding a consumable electrode to said crucible including a clamp for engaging a portion of said electrode, a power tube extending vertically through and movable vertically through an aperture in said cover, sealing means on said cover sealingly engaging said power tube in said vertical movement thereof, a contact plate attached to the lower end of said power tube, means fastening said clamp to said contact plate for mechanical supporting said clamp and said electrode on said power tube for vertical movement therewith and for electrical connection of said electrode to said power tube, and motor driven means attached to the upper end of the power tube for raising and lowering said power tube.

9. In an electric furnace, a crucible, an electrode receiving tube extending upwardly from said crucible, a removable cover for the upper end of said receiving tube, means for vertically feeding a consumable electrode to said crucible including a clamp for engaging a portion of said electrode, a power tube extending vertically through and movable vertically through an aperture in said cover, sealing means on said cover sealingly engaging said power tube in said vertical movement thereof, a contact plate attached to the lower end of said power tube, means fastening said clamp to said contact plate for mechanically supporting said clamp and said electrode on said power tube for vertical movement therewith and for electrical connection of said electrode to said power tube, a crosshead attached to the upper end of the power tube and extending laterally therefrom, a pair of vertically extending masts, means on the ends of the crosshead engaging said masts to be guided thereby, and motor driven means for raising and lowering said crosshead on said masts.

10. An electric furnace as defined in claim 9, comprising a first universal joint connecting the upper end of the power tube to the crosshead, and a second universal joint in said sealing means, said joints accommodating limited angular movements of the power tube with respect to the crosshead and the cover.

11. An electric furnace as defined in claim 10, comprising guide means in said electrode tube and cooperating with said clamp to limit lateral movements of the electrode.

12. An electric furnace as defined in claim 9, including a cross-bar connecting the upper ends of said masts, a thrust bearing in said cross-bar, a lead screw hung from said thrust bearing and extending downwardly through said cross-bar, a nut fixed on said cross-head and threadedly receiving said lead screw, and motor driven means connected to said lead screw for rotating said lead screw.

13. An electric furnace as defined in claim 12, comprising two such thrust bearings adjacent opposite ends of the cross-bar, two lead screws depending therefrom, two nuts on the crosshead threadedly receiving the respective lead screws, and motor driven means for synchronously rotating the two lead screws.

14. An electric furnace comprising a crucible having an upwardly facing opening for receiving therein an electrode moved vertically downwardly through said opening into said crucible, an electrode support disposed above and connected to said electrode to support said electrode, means supporting said electrode support for movement thereof transversely of the vertical between a feeding position above the crucible and a retracted position spaced from the feeding position, guide means supported on said supporting means and engaging said electrode support for guiding said electrode support to insure vertical movement thereof, motor means, and means operatively connecting said motor means to said electrode support for effecting said vertical movement of said electrode support to feed said electrode vertically downward into the crucible when said supporting means is in said feeding position and for moving said electrode support upwardly with respect to said crucible.

References Cited in the file of this patent

UNITED STATES PATENTS

| | | |
|---|---|---|
| 1,732,431 | Bruggmann | Oct. 22, 1929 |
| 2,243,096 | Hardin | May 27, 1941 |
| 2,686,825 | Southern | Aug. 17, 1954 |
| 2,686,826 | Paine | Aug. 17, 1954 |
| 2,789,151 | Boron et al. | Apr. 16, 1957 |
| 2,805,270 | Boron et al. | Sept. 3, 1957 |

FOREIGN PATENTS

| | | |
|---|---|---|
| 45,286 | Norway | June 25, 1928 |

UNITED STATES PATENT OFFICE
CERTIFICATE OF CORRECTION

Patent No. 3,057,935

October 9, 1962

Robert J. Garmy

It is hereby certified that error appears in the above numbered patent requiring correction and that the said Letters Patent should read as corrected below.

Column 12, line 1, for "contact supporting means" read -- contact plate supporting means --.

Signed and sealed this 2nd day of April 1963.

(SEAL)
Attest:

ESTON G. JOHNSON
Attesting Officer

DAVID L. LADD
Commissioner of Patents